(12) United States Patent
Selvaraj et al.

(10) Patent No.: US 11,170,107 B2
(45) Date of Patent: Nov. 9, 2021

(54) FILE RECOVERY USING ANTI-VIRUS ENGINE AND BACKUP PROVIDER

(71) Applicant: Microsoft Technology Licensing, LLC, Redmond, WA (US)

(72) Inventors: Karthik Selvaraj, Kirkland, WA (US); Ramprasad Gowrishankar, Bellevue, WA (US); Gowtham Reddy Animireddygari, Bothell, WA (US); Catalin Daniel Sandu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 15/843,934

(22) Filed: Dec. 15, 2017

(65) Prior Publication Data

US 2019/0188385 A1   Jun. 20, 2019

(51) Int. Cl.
*G06F 21/56* (2013.01)
*G06F 21/55* (2013.01)
*G06F 11/14* (2006.01)
*H04L 29/06* (2006.01)

(52) U.S. Cl.
CPC ........ *G06F 21/568* (2013.01); *G06F 11/1469* (2013.01); *G06F 21/554* (2013.01); *G06F 2201/835* (2013.01); *G06F 2201/84* (2013.01); *H04L 63/14* (2013.01)

(58) Field of Classification Search
CPC .. G06F 21/568; G06F 21/554; G06F 11/1469; G06F 17/22; G06F 2201/835; H04L 63/14

USPC ......................................................... 707/685
See application file for complete search history.

(56) References Cited

U.S. PATENT DOCUMENTS

| 2007/0006304 | A1* | 1/2007 | Kramer | G06F 21/554 726/22 |
| 2008/0016564 | A1* | 1/2008 | Claudatos | G06F 21/568 726/22 |
| 2012/0124007 | A1* | 5/2012 | Sten | G06F 11/1448 707/685 |

OTHER PUBLICATIONS

"International Search Report Issued in PCT Application No. PCT/US2018/062390", dated Feb. 25, 2019, 11 Pages.

* cited by examiner

*Primary Examiner* — Hosain T Alam
*Assistant Examiner* — Tracy M McGhee
(74) *Attorney, Agent, or Firm* — Arent Fox LLP (57) ABSTRACT

Methods and devices for recovering data may include receiving an identification of at least one file on the computer device impacted by a cyber threat. The methods and devices may include receiving a last known good time stamp for the at least one file that identifies a point in time prior to the cyber threat. The methods and devices may also include transmitting, to a remote backup provider associated with the at least one file, a restore request to restore the at least one file with restored content based at least on the last known good time stamp. The methods and devices may include receiving, from the remote backup provider, a restored file with the restored content.

15 Claims, 4 Drawing Sheets

FILE RECOVERY USING ANTI-VIRUS ENGINE AND BACKUP PROVIDER

BACKGROUND

The present disclosure relates to computer systems, and more specifically to file recovery on a computer system.

Quite recently there has been a spike in cyber threats that encrypt files on computer devices resulting in data loss for computer device users. The cyber threats may be referred to as "ransomware," as attackers may ask for a ransom to decrypt/restore the encrypted files attached during the cyber threat. While computer devices attempt to protect against ransomware, it is often the case that ransomware is detected only after a user's data is already maliciously encrypted.

Thus, there is a need in the art for improvements in file recovery systems.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory configured to store data and instructions, at least one processor configured to communicate with the memory, an operating system in communication with the memory and the processer, wherein the operating system is operable to: receive an identification of at least one file on the computer device impacted by a cyber threat; receive a last known good time stamp for the at least one file that identifies a point in time prior to the cyber threat; transmit, to a remote backup provider associated with the at least one file, a restore request to restore the at least one file with restored content based at least on the last known good time stamp; and receive, from the remote backup provider, a restored file with the restored content.

Another example implementation relates to a method for recovering data. The method may include receiving, at an operating system executing on a computer device, an identification of at least one file on the computer device impacted by a cyber threat. The method may include receiving a last known good time stamp for the at least one file that identifies a point in time prior to the cyber threat. The method may include transmitting, to a remote backup provider associated with the at least one file, a restore request to restore the at least one file with restored content based at least on the last known good time stamp. The method may include receiving, from the remote backup provider, a restored file with the restored content.

Another example implementation relates to a computer-readable medium storing instructions executable by a computer device. The computer-readable medium may include at least one instruction for causing the computer device to receive an identification of at least one file on the computer device impacted by a cyber threat. The computer-readable medium may include at least one instruction for causing the computer device to receive a last known good time stamp for the at least one file that identifies a point in time prior to the cyber threat. The computer-readable medium may include at least one instruction for causing the computer device to transmit, to a remote backup provider associated with the at least one file, a restore request to restore the at least one file with restored content based at least on the last known good time stamp. The computer-readable medium may include at least one instruction for causing the computer device to receive, from the remote backup provider, a restored file with the restored content.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for file recovery using an antivirus engine to identify one or more cyber threats on a computer device and a remote backup provider, such as a cloud storage backup provider, to recover any data that may have been impacted by the one or more cyber threats identified. The devices and methods may allow one or more remote backup providers to register with a broker service on a computer device. The broker service may interface between the remote backup providers and one or more antivirus engines operating on the computer device.

The broker service may include a file synchronize engine to periodically synchronize the files stored on the computer device with the remote backup providers. As such, copies of the files stored on the computer device may be backed up with files stored on the remote backup provider.

One or more antivirus engines operating on the computer device may communicate with the broker service. For example, the antivirus engines may notify the broker service of any identified cyber threats to the computer device. Cyber threats may include any code, logic, or program that may attempt to maliciously impact and/or damage data on the computer device and/or restrict access to data on the computer device. Example cyber threats may include, but are not limited to, malware and/or ransomware. The broker service may provide notifications to the remote backup providers notifying the remote backup providers of the identified cyber threat(s). The remote backup providers may use the received information to verify whether files stored on the remote backup provider may be impacted by the identified cyber threat.

In addition, the antivirus engine(s) may identify one or more files where a detected cyber threat may have modified the content of the files. The antivirus engines may identify a last known good time stamp, along with any other metadata associated with the one or more identified files, prior to the modification of the content of the identified files. The antivirus engine(s) may send a restore required notification to the broker service identifying the one or more files that may need to be restored using the backup copy of the files stored at the remote backup provider.

The broker service may receive the restore required notification from the antivirus engine(s) and send a restore request to the remote backup provider that requests the identified files be restored with the backup files stored at the remote backup provider. The remote backup providers may determine whether to restore the identified files using a file-by-file recovery and/or a point in time recovery. The remote backup provider may transmit the restored files to broker service. When the restored files are received at the computer device, the computer device may be restored to a point in time prior to the detected cyber threats.

As such, the devices and methods may provide an end-to-end system that may seamlessly identify one or more files adversely impacted by one or more cyber threats and may allow restoration of the identified file(s) from a remote backup provider. Thus, the devices and methods may be used to ensure that data from the computer device may be stored in reliable way and may be readily accessible if maliciously impacted by one or more cyber threats.

Figure 1:
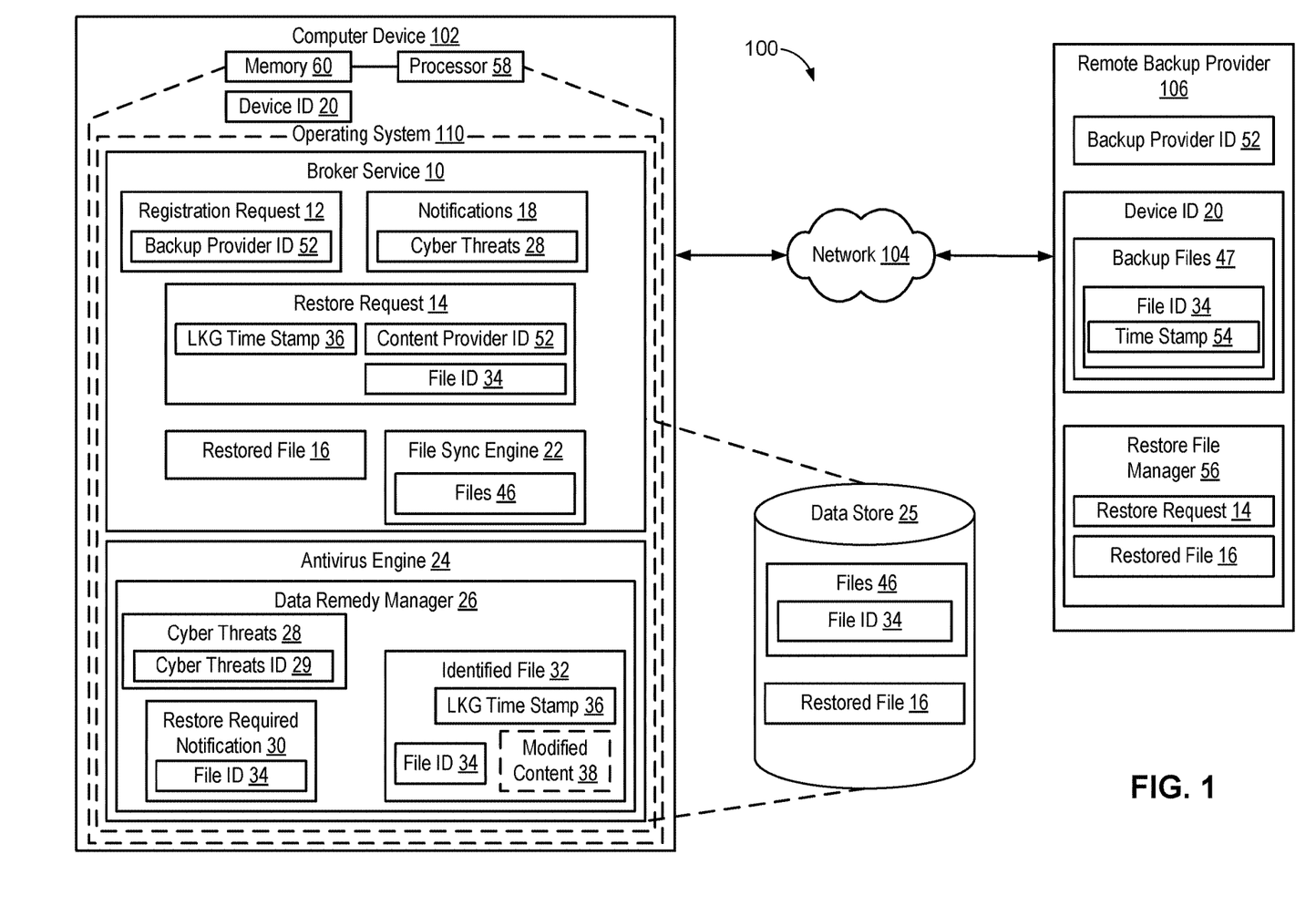
FIG. 1 is a schematic block diagram of an example computer device in communication with an example remote backup provider in accordance with an implementation.

Referring now to FIG. 1, illustrated is an example system 100 that may be used for file recovery on computer device 102 using one or more remote backup providers 106. Computer device 102 includes a broker service 10 that manages maintaining remotely-located backup file(s) 47, on one or more remote backup providers 106, associated with one or more locally-stored files 46 on computer device 102. Further, broker service 10 is in communication with at least one antivirus engine 24 on computer device 102, where antivirus engine 24 monitors computer device 102 for the presence of one or more cyber threats 28 that affect availability of or access to file(s) 46. When antivirus engine 24 detects one or more cyber threats 28, antivirus engine 24 sends broker service 10 a restore required notification 30 for each affected file 46. In response, broker service 10 communicates with the corresponding remote backup provider 106 to obtain the respective backup file 47, thereby restoring access to the file.

Computer device 102 may include an operating system 110 executed by processor 58 and/or system memory 60 of computer device 102. System memory 60 may be configured for storing data and/or computer-executable instructions defining and/or associated with operating system 110, and processor 58 may execute operating system 110. An example of system memory 60 can include, but is not limited to, a type of memory usable by a computer, such as random access memory (RAM), read only memory (ROM), tapes, magnetic discs, optical discs, volatile memory, non-volatile memory, and any combination thereof. An example of processor 58 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include the broker service 10 that may interface between the remote backup providers 106 and one or more antivirus engines 24 operating on computer device 102. For example, broker service 10 may provide a registration request 12 to register each of one or more (e.g., up to n, where n is an integer) remote backup providers 106 so that the remote backup providers 106 may communicate with broker service 10. Each remote backup provider 106 may include a backup provider identification (ID) 52 that may be used by broker service 10 to identify the one or more remote backup providers 106 in the registration request 12.

In addition, broker service 10 may use the registration request 12 to register each one of files 46 with a corresponding remote backup provider 106 to enable file recovery when the respective file 46 is determined to be compromised. The backup provider ID 52 may also be used by broker service 10 to identify the one or more remote backup providers 106 associated with one or more files 46 stored on computer device 102. A user of computer device 102 may select different remote backup providers 106 to backup different files 46 stored on computer device 102. For example, a user may select one remote backup provider 106 to backup work files stored on computer device 102 and a different remote backup provider 106 to backup personal files stored on computer device 102. As such, one or more remote backup providers 106 may be used by computer device 102 to back up the files 46 stored on computer device 102.

Additionally, broker service 10 may include a file synchronization engine 22 that may periodically send the files 46 stored on computer device 102 to the associated remote backup provider 106 so that the backup files 47 on the remote backup provider 106 may remain synchronized with the content and/or code of the files 46 stored on computer device 102.

Remote backup provider 106 may associate the backup files 47 with the respective device identification (ID) 20 of the computer device 102 that transmitted the files 46 for storage. In addition, remote backup provider 106 may associate a time stamp 54 with the backup files 47. As such, as the content associated with each file 46 is updated on computer device 102, remote backup provider 106 may store a new version of the backup file 47 with an associated time stamp 54.

Broker service 10 may also receive cyber threats 28 identified from one or more (e.g., up to m, where m is an integer) antivirus engines 24 operating on computer device 102. Antivirus engines 24 may be used to prevent, detect, and/or remove cyber threats 28 on computer device 102. Cyber threats 28 may include information identifying code, logic, programming, etc., that may attempt to maliciously impact and/or damage and/or restrict access to files 46 and/or content on computer device 102. Example cyber threats 28 may include, but are not limited to, information identifying malware and/or ransomware. Each cyber threat 28 may be associated with a cyber threat ID 29. Antivirus engine 24 may have a data remedy manager 26 that may identify the one or more cyber threats 28 on computer device and may transmit the one or more cyber threats IDs 29 to broker service 10.

Broker service 10 may send one or more notifications 18 to the registered remote backup providers 106 with information about the detected cyber threats 28. As such, the remote backup providers 106 may be informed about potential malicious behavior detected on computer device 102 and may take any necessary precautions to protect the backup files 47 at the remote backup provider 106 and/or alert other computer devices in its network about cyber threat 28.

In addition, data remedy manager 26 may access a data store 25 of files 46 on computer device 102 and may identify one or more files 32 that may be impacted by the one or more cyber threats 28. Data remedy manager 26 may determine that the identified files 32 may need to be restored and/or remedied. For example, the one or more identified files 32 may include modified content 38 where a malware virus may have adversely modified and/or changed the content of the identified file 32. In addition, access may be restricted to the one or more identified files 32. For example, a cyber threat 28 in the form of ransomware cyber may restrict access to the identified file 32 until a ransom or other form of payment is received.

Data remedy manager 26 may identify a last known good time stamp 36 of the identified files 32, along with any other metadata associated with the identified files 32, prior to any modification of the content and/or any restriction of accessing the identified file 32. Metadata may include, but is not limited to, an identification of a portion of the files modified, a file name, a file version, and a process load time into memory. The last known good time stamp 36 of the identified files 32 may include, for example, a determination of a first known malicious activity on the identified files 32. For example, the last known good time stamp 36 may identify when a first known malicious change occurred to the identified files 32. In addition, the last known good time stamp 36 may, for example, identify a first sign of malicious activity that started an infection on the identified files 32. In an implementation, data remedy manager 26 may monitor processes executing on computer device 102, when a cyber threat 28 is identified in a process executing on computer device 102, data remedy manager 26 may determine when the process started and may identify the last known good time stamp 36 for the process at the start time of the process.

Data remedy manager 26 may attempt to remedy the identified cyber threats 28 and/or remove the identified cyber threats 28 from computer device 102. During a cleanup process to remove and/or remedy the identified cyber threats 28, data remedy manager 26 may confirm that one or more files 46 of computer device 102 remain intact and have not been modified by the one or more identified cyber threats 28.

In addition, data remedy manager 26 may determine that one or more cyber threats 28 may have impacted one or more identified files 32 and that the identified files 32 may need to be restored and/or remedied. For example, a ransomware attack on computer device 102 may have encrypted the identified file 32 and may request a form of payment prior to decrypting and/or restoring the identified file 32. Another example may include a malware virus maliciously modifying the identified file 32. Data remedy manager 26 may determine that a bulk restore may be required (e.g., majority of the files on computer device 102 may need to be restored) and/or a file level restore may be required. Thus, data remedy manager 26 may transmit a restore required notification 30 with the file IDs 34 of the one or more identified files 32 to broker service 10, along with the cyber threats IDs 29 of the identified cyber threats 28. In addition, the restore required notification 30 may include the last known good time stamp 36 of the identified files 32, along with any other metadata associated with the identified files 32.

Broker service 10 may receive the restore required notification 30 and may transmit a restore request 14 to the remote backup provider(s) 106 associated with the identified file(s) 32. In some cases, different remote backup providers 106 may be associated with different ones of the identified files 32. For example, a portion of the identified files 32 may include photographs while another portion of the identified files 32 may include work information. A user of computer device 102 may designate one remote backup providers 106, such as a first file-hosting service, for the photographs and another remote backup provider 106, such as a second file-hosting service, for the work information. As such, broker service 10 may identify the remote backup provider 106 associated with the identified files 32 and may transmit the restore request 14 to the appropriate remote backup providers 106.

The restore request 14 may request that the identified files 32 be restored with the backup files 47 stored at remote backup provider 106. For example, the restore request 14 may include the backup provider ID 52 of the associated remote backup provider 106, the file IDs 34 of the identified files 32, the last known good time stamp 36 of the identified files 32, and/or any other metadata associated with the identified files 32.

The remote backup provider 106 may have a restore file manager 56 that receives the restore request 14. The restore file manager 56 may retrieve the backup files 47 that corresponds to the one or more file IDs 34 and generate one or more restored files 16 with the restored content from the backup files 47. The restore file manager 56 may verify that the time stamp 54 associated with the restored file 16 either corresponds to the last known good time stamp 36 and/or is prior to the last known good time stamp 36. For example, if antivirus engine 24 indicates a last known good time stamp 36 of 10:00 a.m. in the morning for the identified files, remote backup provider 106 may retrieve one of a plurality of backup files 47 having a time stamp that occurs on or before 10:00 a.m. in the morning when restoring the content of the requested file. Thus, by using the last known good time stamp 36 and/or any received metadata in restoring the content for the identified file 32, restore file manager 56 may ensure that the restored file 16 occurred prior to the identified cyber threat 28.

Restore file manager 56 may transmit the restored file(s) 16 with the restored content to broker service 10. Broker service 10 may receive the restored files 16 and may update data store 25 with the restored files 16. When the restored files 16 are received at computer device 102, computer device 102 may be restored to a point in time prior to the detected cyber threats 28. For example, the one or more cyber threats 28 may be removed from computer device 102 along with the identified files 32 impacted by the cyber threats 28. In addition, the restored files 16 may be restored to a point in time with a latest version of the files available at the point in time without, for example, having to pay a ransom.

As such, when one or more cyber threats 28, such as but not limited to malware and/or ransomware, are identified on computer device 102 by antivirus engine 24 and have either maliciously modified content of one or more identified files 32 and/or may be restricting access to the identified files 32, broker service 10 may interface with one or more remote backup providers 106 and notify the one or more remote backup providers 106 of the identified cyber threats 28. In addition, broker service 10 may seamlessly facilitate the restoration of the identified files 32. For example, broker service 10 may guide a user through a file restoration process that allows a user to authorize the restoration of the identified files 32 with backup files 47 stored at the remote backup provider 106. Another implementation may include the broker service 10 automatically sending a restore request 14 to remote backup providers 106 and receiving the requested restored files 16. Thus, system 100 may be used to ensure that data from computer device 102 may be stored in a reliable manner and may be readily accessible if maliciously impacted by a cyber threat 28.

Figure 2:
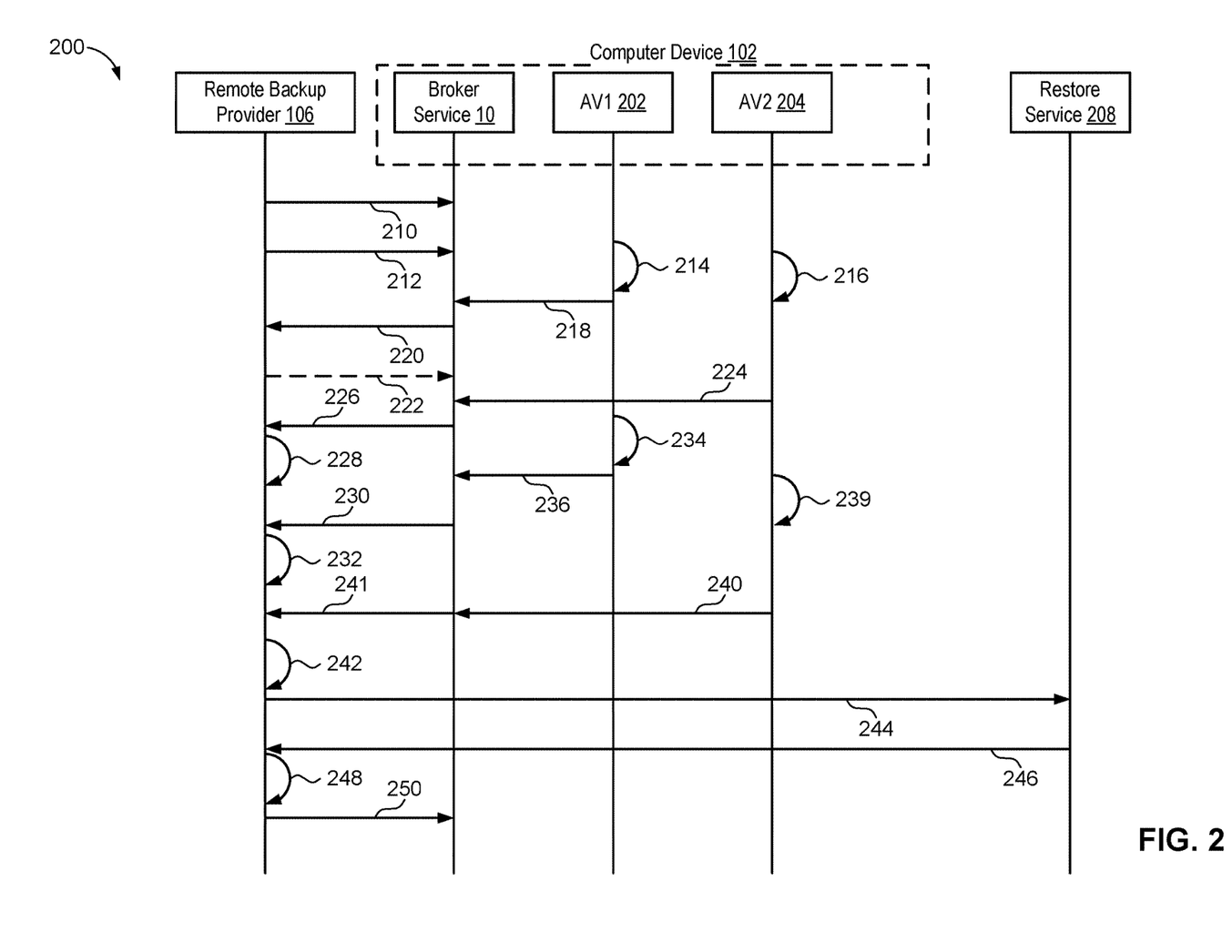
FIG. 2 is an example message flow diagram for recovering data from a remote backup provider with multiple antivirus engines operating on a computer device in accordance with an implementation.

Referring now to FIG. 2, an example method flow 200 for recovering data from a remote backup provider 106 may be implemented by computer device 102 with multiple antivirus engines 202, 204 operating on a computer device 102. As discussed above in FIG. 1, remote backup provider 106 may be previously registered with broker service 10 to transmit and/or receive communications.

At 210, remote backup provider 106 may send a registration request to broker service 10 for notifications regarding one or more identified cyber threats 28 (FIG. 1). Cyber threats 28 may include may include information identifying code, logic, programming, etc., that may attempt to maliciously impact and/or damage and/or restrict access to files on computer device 102.

At 212, remote backup provider 106 may provide broker service 10 updated state information for the remote backup provider 106. State information for the remote backup provider 106 may include, but is not limited to, unavailable, synchronization in progress (e.g., data from computer device 102 is uploading to the remote backup provider 106), synchronization completed (e.g., data from computer device 102 is finished uploading to the remote backup provider 106), synchronization paused (e.g., the synchronization of the data from computer device 102 with the remote backup provider 106 may be paused), data corruption found, bulk restore required, and/or file level restore required.

At 214, a first antivirus engine 202 may detect one or more cyber threats 28. For example, antivirus engine 202 may detect ransomware on computer device 102. At 218, antivirus engine 202 may send a notification to broker service 10 indicating that the one or more cyber threats 28 have been found on computer device 102.

At 220, broker service 10 may send a notification to remote backup provider 106 identifying the one or more threats 28 found on computer device 102 by antivirus engine 202.

At 222, remote backup provider 106 may optionally send broker service 10 updated state information for the remote backup provider 106. For example, remote backup provider 106 may change the state information to data corruption found.

At 216, a second antivirus engine 204 may also detect one or more cyber threats 28, such as ransomware, on computer device 102. At 224, antivirus engine 204 may send a notification to broker service 10 indicating that one or more cyber threats 28 have been found on computer device 102.

At 226, broker service 10 may send a notification to remote backup provider 106 identifying the one or more threats 28 found on computer device 102 by antivirus engine 204.

At 228, remote backup provider 106 may determine that a change in state information may not be required since the state information previously changed to data corruption found.

At 234, antivirus engine 202 may complete the remediation process for the identified cyber threat 28. At 236, antivirus engine 202 may transmit a notification to broker service 10 indicating that the remediation process for the identified cyber threat 28 is completed along with the status of the remediation (e.g., the remediation was successfully or the remediation failed). When the remediation is successful, the identified cyber threats 28 may be removed from computer device 102 and/or quarantined on computer device 102. When the remediation fails, the identified cyber threats 28, or a portion of the cyber threat 28, may remain on computer device 102.

At 230, broker service 10 may transmit a notification to remote backup provider 106 with the remediation status provided by antivirus engine 202. The remediation status may include whether the restoration was successful and/or failed. In addition, the remediation status may include one or more identified files that may need to be restored by remote backup provider 106, along with a last known good time stamp for the identified files.

At 232, remote backup provider 106 may wait for all outstanding remediation status calls for each of antivirus engine 202 and antivirus engine 204 before performing any restoration of identified files.

At 239, antivirus engine 204 may complete the remediation process for the identified cyber threat 28. At 240, antivirus engine 204 may transmit a notification to broker service 10 indicating that the remediation process for the identified cyber threat 28 is completed and the status of the remediation (e.g., the remediation was successfully or the remediation failed).

At 241, broker service 10 may transmit a notification to remote backup provider 106 with the remediation status provided by antivirus engine 204. The remediation status may include whether the restoration was successful and/or failed. In addition, the remediation status may include one or more identified files that may need to be restored by remote backup provider 106, along with a last known good time stamp for the identified files.

At 242, remote backup provider 106 may consolidate the results received from antivirus engine 202 and antivirus engine 204. For example, if antivirus engine 202 is successful in the remediation process and identifies one or more files that may need to be restored, and antivirus engine 204 indicates a failure, remote backup provider 106 may proceed with the restoration request by antivirus engine 202, while ignoring the failure indication received from antivirus engine 204. If both antivirus engine 202 and antivirus engine 204 report a successful remediation process and identify one or more files that may need to be restored, remote backup provider 106 may use the oldest last known good time stamp received for the identified files from antivirus engine 202 and/or antivirus engine 204 when restoring the files. For example, if antivirus engine 202 indicates a last known good time stamp of 10:00 a.m. in the morning, while antivirus engine 204 indicates a last know good time stamp of 10:30 a.m., remote backup provider 106 may use the older time of 10:00 a.m. when restoring the content of the requested file.

At 244, remote backup provider 106 may transmit the remediation status and/or any last known good time stamps to a remote backup provider restore service 208 to determine whether any restoration of the identified files is required. At 246, restore service 208 may notify remote backup provider 106 that one or more files require restoration.

At 248, remote backup provider 106 may determine whether the files require restoration, and at 250, remote backup provider 106 may send broker service 10 updated state information for the remote backup provider 106. For example, if the files require restoration, remote backup provider 106 may change the state information to restore required. If the files do not require restoration, remote backup provider 106 may change the state information to synchronization in process if remote backup provider 106 is synchronizing files with computer device 102.

As illustrated, broker service 10 may facilitate communications between remote backup provider 106 and/or the one or more antivirus engines 202 and 204 operating on computer device 102.

Figure 3:
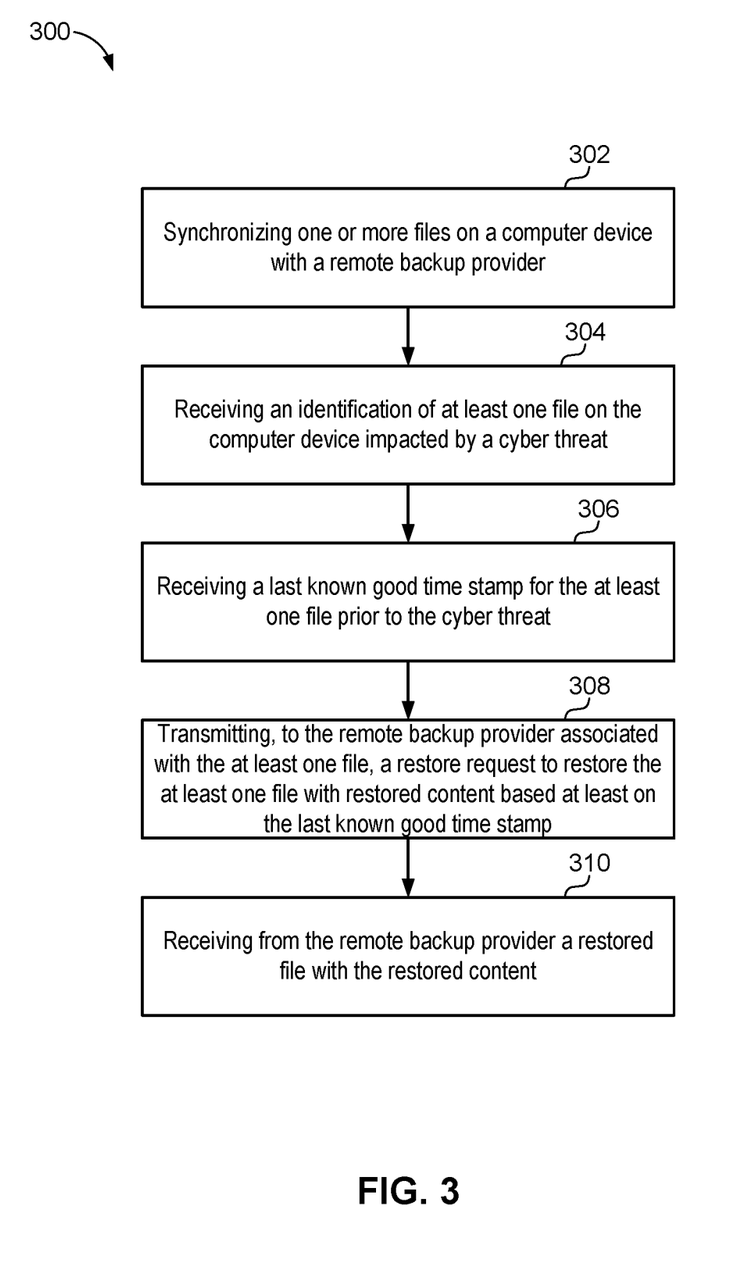
FIG. 3 is an example method flow for recovering data from a remote backup provider in accordance with an implementation.

Referring now to FIG. 3, illustrated is an example method 300 implemented by computer device 102 for recovering data from a remote backup provider 106.

At 302, method 300 may include synchronizing one or more files on a computer device with a remote backup provider. For example, a broker service 10 on computer device 102 may include a file synchronization engine 22 that may periodically send the files 46 stored on computer device 102 to the associated remote backup provider 106 so that files 46 stored on computer device 102 may be backed up using remote backup provider 106. A user of computer device 102 may select different remote backup providers 106 to backup different files 46 stored on computer device 102. For example, a user may select one remote backup provider 106 to backup work files stored on computer device 102 and a different remote backup provider 106 to backup personal files stored on computer device 102. As such, one or more remote backup providers 106 may be used by computer device 102 to back up the files 46 stored on computer device 102.

Remote backup provider 106 may associate the backup files 47 with the respective device identification (ID) 20 of the computer device 102 that transmitted the files 46 for storage. In addition, remote backup provider 106 may associate a time stamp 54 with the backup files 47. As such, as the files 46 are updated on computer device 102, remote backup provider 106 may backup the changes to the files 46.

At 304, method 300 may include receiving an identification of at least one file on the computer device impacted by a cyber threat. Broker service 10 may also receive cyber threats 28 identified from one or more antivirus engines 24 operating on computer device 102. Antivirus engines 24 may be used to prevent, detect, and/or remove cyber threats 28 on computer device 102. Cyber threats 28 may include may include information identifying code, logic, programming, etc., that may attempt to maliciously impact and/or damage and/or restrict access to files 46 and/or content on computer device 102. Example cyber threats 28 may include, but are not limited to, information identifying malware and/or ransomware. Antivirus engine 24 may have a data remedy manager 26 that may identify the one or more cyber threats 28 on computer device and may transmit the one or more identified cyber threats 28 to broker service 10.

Broker service 10 may send one or more notifications 18 to the registered remote backup providers 106 with information about the detected cyber threats 28. As such, the remote backup providers 106 may be informed about potential malicious behavior detected on computer device 102 and may take any necessary precautions to protect the backup files 47 at the remote backup provider 106 and/or alert other computer devices in its network about cyber threats 28.

In addition, data remedy manager 26 may access a data store 25 of files 46 on computer device 102 and may identify one or more files 32 that may be impacted by the one or more cyber threats 28. Data remedy manager 26 may determine that the identified files 32 may need to be restored and/or remedied. For example, the one or more identified files 32 may include modified content 38 where a malware virus may have adversely modified and/or changed the content of the identified file 32. In addition, access may be restricted to the one or more identified files 32. For example, a cyber threat 28 in the form of ransomware may restrict access to the identified file 32 until a ransom or other form of payment is received. Data remedy manager 26 may determine that a bulk restore may be required (e.g., majority of the files on computer device 102 may need to be restored) and/or a file level restore may be required.

Data remedy manager 26 may determine that one or more cyber threats 28 may have impacted one or more identified files 32 and that the identified files 32 may need to be restored and/or remedied. For example, a cyber threat 28 in the form of ransomware may have encrypted the identified file 32 and may request a form of payment prior to decrypting and/or restoring the identified file 32. Another example may include a malware virus maliciously modifying the identified file 32. Thus, data remedy manager 26 may transmit a restore required notification 30 with the file IDs 34 of the one or more identified files 32, along with the cyber threat ID 29 of the identified cyber threats 28 to broker service 10.

At 306, method 300 may include receiving a last known good time stamp for the at least one file prior to the cyber threat. For example, data remedy manager 26 may identify a last known good time stamp 36 of the identified files 32, along with any other metadata associated with the identified files 32, prior to any modification of the content and/or any restriction of accessing the identified file 32. Metadata may include, but is not limited to, an identification of a portion of the files modified, a file name, a file version, and a process load time into memory. The last known good time stamp 36 of the identified files 32 may include, for example, a determination of a first known malicious activity on the identified files 32. Data remedy manager 26 may transmit the last known good time stamp 36 and/or any other metadata associated with the identified files 32 to broker service 10. For example, the restore required notification 30 may include the last known good time stamp 36 of the identified files 32, along with any other metadata associated with the identified files 32.

At 308, method 300 may include transmitting, to the remote backup provider associated with the at least one file, a restore request to restore the at least one file with restored content based at least on the last known good time stamp. Broker service 10 may receive the restore required notification 30 and may transmit a restore request 14 to the remote backup provider(s) 106 associated with the identified files 32.

In some cases, different remote backup providers 106 may be associated with different ones of the identified files 32. For example, a portion of the identified files 32 may include photographs while another portion of the identified files 32 may include work information. A user of computer device 102 may designate one remote backup providers 106, such as a first file-hosting service, for the photographs and another remote backup provider 106, such as a second file-hosting service, for the work information. As such, broker service 10 may identify the remote backup provider 106 associated with the identified files 32 and may transmit the restore request 14 to the appropriate remote backup providers 106.

The restore request 14 may request that the identified files 32 be restored with the backup files 47 stored at remote backup provider 106. For example, the restore request 14 may include the backup provider ID 52 of the associated remote backup provider 106, the file IDs 34 of the identified files 32, the last known good time stamp 36 of the identified files 32, and/or any other metadata associated with the identified files 32.

The remote backup provider 106 may have a restore file manager 56 that receives the restore request 14. The restore file manager 56 may retrieve the backup files 47 that corresponds to the one or more file IDs 34 and generate one or more restored files 16 with the restored content. The restore file manager 56 may verify that the time stamp 54 associated with the restored file 16 either corresponds to the last known good time stamp 36 and/or is prior to the last known good time stamp 36. For example, if antivirus engine 24 indicates a last known good time stamp 36 of 10:00 a.m. in the morning for the identified files, remote backup provider 106 may retrieve one of a plurality of backup files 47 having a time stamp 54 that occurs on or before 10:00 a.m. in the morning when restoring the content of the requested file. Thus, by using the last known good time stamp 36 and/or any received metadata in restoring the content for the identified file 32, restore file manager 56 may ensure that the restored files 16 occurred prior to the identified cyber threat 28.

At 310, method 300 may include receiving from the remote backup provider a restored file with the restored content. Broker service 10 may receive the restored files 16 from restore file manager 56. Broker service 10 may update the identified files 32 on computer device 102 with the restored files 16. As such, computer device 102 may be restored to a point in time prior to the detected cyber threats 28. For example, the one or more cyber threats 28 may be removed from computer device 102 along with the identified files 32 impacted by the cyber threats 28. In addition, the restored files 16 may be restored to a point in time with a latest version of the files available at the point in time Thus, method 300 may seamlessly identify one or more files on computer device 102 adversely impacted by one or more cyber threats and may allow restoration of the identified file from a remote backup provider. Method 300 may also be used to ensure that data from computer device 102 may be stored in reliable way using remote backup provider 106 and may be readily accessible if maliciously impacted by one or more cyber threats 28.

Figure 4:
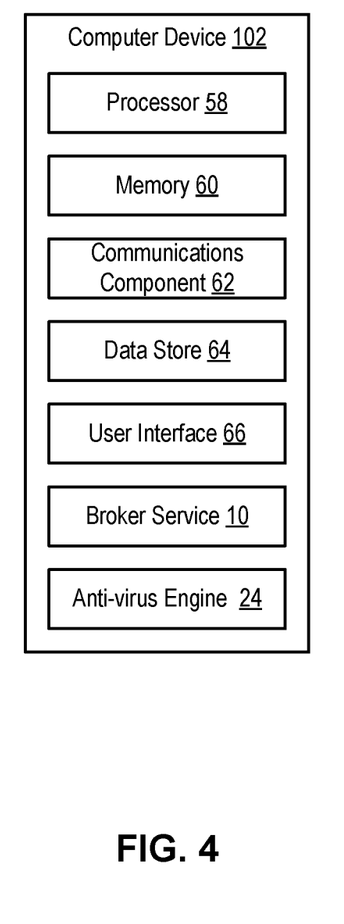
FIG. 4 is a schematic block diagram of an example computer device in accordance with an implementation of the present disclosure.

Referring now to FIG. 4, illustrated is an example computer device 102 in accordance with an implementation, including additional component details as compared to FIG. 1. In one example, computer device 102 may include processor 58 for carrying out processing functions associated with one or more of components and functions described herein. Processor 58 can include a single or multiple set of processors or multi-core processors. Moreover, processor 58 can be implemented as an integrated processing system and/or a distributed processing system.

Computer device 102 may further include memory 60, such as for storing local versions of applications being executed by processor 58. Memory 60 can include a type of memory usable by a computer, such as random access memory (RAM), read only memory (ROM), tapes, magnetic discs, optical discs, volatile memory, non-volatile memory, and any combination thereof.

Further, computer device 102 may include a communications component 62 that provides for establishing and maintaining communications with one or more parties utilizing hardware, software, and services as described herein. Communications component 62 may carry communications between components on computer device 102, as well as between computer device 102 and external devices, such as devices located across a communications network and/or devices serially or locally connected to computer device 102. For example, communications component 62 may include one or more buses, and may further include transmit chain components and receive chain components associated with a transmitter and receiver, respectively, operable for interfacing with external devices.

Additionally, computer device 102 may include a data store 64, which can be any suitable combination of hardware and/or software, that provides for mass storage of information, databases, and programs employed in connection with implementations described herein. For example, data store 64 may be a data repository for broker service 10 (FIG. 1) and/or antivirus engine 24 (FIG. 1).

Computer device 102 may also include a user interface component 66 operable to receive inputs from a user of computer device 102 and further operable to generate outputs for presentation to the user. User interface component 66 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 66 may include one or more output devices, including but not limited to a display, a speaker, a haptic feedback mechanism, a printer, any other mechanism capable of presenting an output to a user, or any combination thereof.

In an implementation, user interface component 66 may transmit and/or receive messages corresponding to the operation of broker service 10 and/or antivirus engine 24. In addition, processor 58 executes broker service 10 and/or antivirus engine 24, and memory 60 or data store 64 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/ or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
memory configured to store data and instructions; and
a processor configured to communicate with the memory, wherein the processor is operable to:
  send, by a broker service that is configured to operate on the computer device to provide an interface between at least one antivirus engine and at least one remote backup provider, a registration request to register a file that is stored on the computer device with a remote backup provider for backup;
  identify, by a first antivirus engine that is configured to operate on the computer device, a cyber threat in a process executing on the computer device;
  identify, by a second antivirus engine that is configured to operate on the computer device, the cyber threat in the process executing on the computer device;
  identify, by the first antivirus engine, that the file needs to be restored due to the cyber threat;
  identify, by the second antivirus engine, that the file needs to be restored due to the cyber threat;
  identify, by the first antivirus engine, a last known good time stamp for the file, wherein the last known good time stamp identifies a point in time prior to the cyber threat;
  identify, by the second antivirus engine, another last known good timestamp for the file, wherein the another last known good time stamp identifies another point in time prior to the cyber threat;
  perform, by the first antivirus engine, a first remediation process to remove the cyber threat from the computer device;
  perform, by the second antivirus engine, a second remediation process to remove the cyber threat from the computer device;
  send, by the first antivirus engine to the broker service, a first restore required notification that identifies the file, a first remediation status indicating whether the first remediation process was successful, and the last known good time stamp;
  send, by the second antivirus engine to the broker service, a second restore required notification that identifies the file, a second remediation status indicating whether the second remediation process was successful, and the another last known good time stamp;
  send, by the broker service to the remote backup provider, a restore request that identifies the file, the first remediation status, the second remediation status, the last known good time stamp, and the another last known good time stamp, to restore the file with restored content; and
  receive, by the broker service from the remote backup provider, a restored file with the restored content, wherein, responsive to both the first remediation process and the second remediation process being successful, the restored content is based on an older one of the last known good time stamp and the another last known good time stamp.

2. The computer device of claim 1, wherein the processor is further operable to periodically synchronize, by the broker service, the file with the remote backup provider.

3. A method for recovering data, comprising:
- sending, by a broker service that is configured to operate on a computer device to provide an interface between at least one antivirus engine and at least one remote backup provider, a registration request to register a file that is stored on the computer device with a remote backup provider for backup;
- identifying, by a first antivirus engine that is configured to operate on the computer device, a cyber threat in a process executing on the computer device;
- identifying, by a second antivirus engine that is configured to operate on the computer device, the cyber threat in the process executing on the computer device;
- identifying, by the first antivirus engine, that the file needs to be restored due to the cyber threat;
- identifying, by the second antivirus engine, that the file needs to be restored due to the cyber threat;
- identifying, by the first antivirus engine, a last known good time stamp for the file, wherein the last known good time stamp identifies a point in time prior to the cyber threat;
- identifying, by the second antivirus engine, another last known good timestamp for the file, wherein the another last known good time stamp identifies another point in time prior to the cyber threat;
- performing, by the first antivirus engine, a first remediation process to remove the cyber threat from the computer device;
- performing, by the second antivirus engine, a second remediation process to remove the cyber threat from the computer device;
- sending, by the first antivirus engine to the broker service, a first restore required notification that identifies the file, a first remediation status indicating whether the first remediation process was successful, and the last known good time stamp;
- sending, by the second antivirus engine to the broker service, a second restore required notification that identifies the file, a second remediation status indicating whether the second remediation process was successful, and the another last known good time stamp;
- sending, by the broker service to the remote backup provider, a restore request that identifies the file, the first remediation status, the second remediation status, the last known good time stamp, and the another last known good time stamp, to restore the file with restored content; and
- receiving, by the broker service from the remote backup provider, a restored file with the restored content, wherein, responsive to both the first remediation process and the second remediation process being successful, the restored content is based on an older one of the last known good time stamp and the another last known good time stamp.

4. The method of claim 3, further comprising periodically synchronizing, by the broker service, the file with the remote backup provider.

5. A non-transitory computer-readable medium storing instructions executable by a computer device, comprising:
- at least one instruction for sending, by a broker service that is configured to operate on the computer device to provide an interface between at least one antivirus engine and at least one remote backup provider, a registration request to register a file that is stored on the computer device with a remote backup provider for backup;
- at least one instruction for identifying, by a first antivirus engine that is configured to operate on the computer device, a cyber threat in a process executing on the computer device;
- at least one instruction for identifying, by a second antivirus engine that is configured to operate on the computer device, the cyber threat in the process executing on the computer device:
- at least one instruction for identifying, by the first antivirus engine, that the file needs to be restored due to the cyber threat;
- at least one instruction for identifying, by the second antivirus engine, that the file needs to be restored due to the cyber threat;
- at least one instruction for identifying, by the first antivirus engine, a last known good time stamp for the file, wherein the last known good time stamp identifies a point in time prior to the cyber threat;
- at least one instruction for identifying, by the second antivirus engine, another last known good timestamp for the file, wherein the another last known good time stamp identifies another point in time prior to the cyber threat;
- at least one instruction for performing, by the first antivirus engine, a first remediation process to remove the cyber threat from the computer device;
- at least one instruction for performing, by the second antivirus engine, a second remediation process to remove the cyber threat from the computer device;
- at least one instruction for sending, by the first antivirus engine to the broker service, a first restore required notification that identifies the file, a first remediation status indicating whether the first remediation process was successful, and the last known good time stamp;
- at least one instruction for sending, by the second antivirus engine to the broker service, a second restore required notification that identifies the file, a second remediation status indicating whether the second remediation process was successful, and the another last known good time stamp;
- at least one instruction for sending, by the broker service to the remote backup provider, a restore request that identifies the file, the first remediation status, the second remediation status, the last known good time stamp, and the another last known good time stamp, to restore the file with restored content; and
- at least one instruction for receiving, by the broker service from the remote backup provider, a restored file with the restored content, wherein, responsive to both the first remediation process and the second remediation process being successful, the restored content is based on an older one of the last known good time stamp and the another last known good time stamp.

6. The non-transitory computer-readable medium of claim 5, further comprising at least one instruction for periodically synchronizing, by the broker service, the file with the remote backup provider.

7. The computer device of claim 1, wherein the processor is further operable to:
- receive, by the broker service from the remote backup provider, a registration request for receiving notifications regarding any identified cyber threats.

8. The computer device of claim 7, wherein the processor is further operable to:

send, by the broker service to the remote backup provider, a first notification identifying that the cyber threat has been found on the computer device by the first antivirus engine; and send, by the broker service to the registered remote backup provider, a second notification identifying that the cyber threat has been found on the computer device by the second antivirus engine.

9. The computer device of claim 1, wherein, in response to the first remediation process being successful and the second remediation process having failed, the restored content is based on the last known good time stamp.

10. The method of claim 3, further comprising:
receiving, by the broker service from the remote backup provider, a registration request for receiving notifications regarding any identified cyber threats.

11. The method of claim 10, further comprising:
sending, by the broker service to the remote backup provider, a first notification identifying that the cyber threat has been found on the computer device by the first antivirus engine; and
sending, by the broker service to the remote backup provider, a second notification identifying that the cyber threat has been found on the computer device by the second antivirus engine.

12. The method of claim 3, wherein, in response to the first remediation process being successful and the second remediation process having failed, the restored content is based on the last known good time stamp that is identified by the first antivirus engine.

13. The non-transitory computer-readable medium of claim 5, further comprising:
at least one instruction for receiving, by the broker service from the remote backup provider, a registration request for receiving notifications regarding any identified cyber threats.

14. The non-transitory computer-readable medium of claim 13, further comprising:
at least one instruction for sending, by the broker service to the remote backup provider, a first notification identifying that the cyber threat has been found on the computer device by the first antivirus engine; and
at least one instruction for sending, by the broker service to the remote backup provider, a second notification identifying that the cyber threat has been found on the computer device by the second antivirus engine.

15. The non-transitory computer-readable medium of claim 5, wherein, responsive to the first remediation process being successful and the second remediation process having failed, the restored content is based on the last known good time stamp that is identified by the first antivirus engine.

\* \* \* \* \*